(12) United States Patent
Bergström et al.

(10) Patent No.: US 8,978,498 B2
(45) Date of Patent: Mar. 17, 2015

(54) INTERLOCKING DEVICE IN A VEHICLE TRANSMISSION

(75) Inventors: Klas Bergström, Västra Frölunda (SE); Anders Hedman, Marstrand (SE)

(73) Assignee: Volvo Lastvagnar AB, Göteborg (SE)

( * ) Notice: Subject to any disclaimer, the term of this patent is extended or adjusted under 35 U.S.C. 154(b) by 673 days.

(21) Appl. No.: 13/320,258

(22) PCT Filed: May 10, 2010

(86) PCT No.: PCT/EP2010/002853
§ 371 (c)(1),
(2), (4) Date: Nov. 12, 2011

(87) PCT Pub. No.: WO2010/130389
PCT Pub. Date: Nov. 18, 2010

(65) Prior Publication Data
US 2012/0111685 A1    May 10, 2012

Related U.S. Application Data (60) Provisional application No. 61/177,418, filed on May 12, 2009.

(51) Int. Cl.
*F16H 63/36* (2006.01)
*F16H 3/00* (2006.01)
(Continued)

(52) U.S. Cl.
CPC ............. *F16H 63/36* (2013.01); *Y10T 74/2011* (2013.01); *F16H 3/006* (2013.01); *F16H 3/0915* (2013.01); *F16H 61/688* (2013.01); *F16H 2063/3079* (2013.01); *F16H 2312/08* (2013.01)
USPC ............................................ 74/325; 192/48.6

(58) Field of Classification Search
CPC ... F16H 3/006; F16H 2312/08; F16H 3/0915; F16H 2063/3079; F16H 61/688; F16H 63/36

USPC ....... 74/322, 325, 330; 192/48.6, 48.91, 84 R
See application file for complete search history.

(56) References Cited

U.S. PATENT DOCUMENTS 1,601,048 A * 9/1926 Sponable ................... 74/473.24
3,795,153 A * 3/1974 Seilly .............................. 74/335
(Continued)

FOREIGN PATENT DOCUMENTS

DE          293146 C    7/1916
DE    102004052804 B3    1/2006
(Continued)

OTHER PUBLICATIONS

International Search Report for corresponding International Application PCT/EP2010/002853.
(Continued)

*Primary Examiner* — William Kelleher
*Assistant Examiner* — Zakaria Elahmadi
(74) *Attorney, Agent, or Firm* — WRB-IP LLC (57) ABSTRACT

An interlocking device arranged to prevent at least one forbidden combination of engaged/disengaged positions of three tooth clutch groups in a vehicle transmission is provided. Each tooth clutch group is arranged to rotationally lock/unlock a shaft from a gearwheel. A shift rod is arranged to push a tooth clutch between engaged/disengaged position. The interlocking device includes movable elements where each movable element is directed towards one of the shift rods in order to lock one of the tooth clutch groups in the disengaged position, and an interlocking element arranged in the middle of the movable elements. A diameter of the interlocking element and lengths of the movable elements are adapted to allow only two of the tooth clutch groups to be engaged simultaneously.

7 Claims, 7 Drawing Sheets

|     | 1 | 2 | 3 | 4 |
|-----|---|---|---|---|
| 121 | • |   | • |   |
| 122 |   | • |   | • |
| 140 | • | • |   |   |
| 150 | • |   |   | • |
| 160 |   |   | • | • |

(51) Int. Cl.
  *F16H 3/091* (2006.01)
  *F16H 61/688* (2006.01)
  *F16H 63/30* (2006.01)

(56) References Cited

U.S. PATENT DOCUMENTS

| | | | |
|---|---|---|---|
| 4,068,537 A * | 1/1978 | Wolfe | 74/473.11 |
| 4,094,206 A * | 6/1978 | Sogo et al. | 74/360 |
| 4,197,760 A * | 4/1980 | Wolfe | 74/473.24 |
| 4,852,421 A * | 8/1989 | Kerboul | 74/473.21 |
| 5,150,628 A | 9/1992 | Alfredsson | |
| 5,927,146 A * | 7/1999 | Dutson | 74/333 |
| 5,966,989 A | 10/1999 | Reed, Jr. et al. | |
| 6,026,698 A * | 2/2000 | Weston | 74/335 |
| RE39,598 E | 5/2007 | Markyvech et al. | |
| 7,584,679 B2 * | 9/2009 | Cho | 74/325 |
| 7,938,037 B2 * | 5/2011 | John et al. | 74/335 |
| 7,963,182 B2 * | 6/2011 | Wright | 74/335 |
| 2006/0185456 A1 * | 8/2006 | Gerlofs et al. | 74/325 |
| 2006/0243076 A1 * | 11/2006 | Tsuji et al. | 74/325 |
| 2008/0229854 A1 * | 9/2008 | Mizuno et al. | 74/335 |
| 2008/0245167 A1 | 10/2008 | Gitt | |
| 2009/0084208 A1 * | 4/2009 | Hayakawa et al. | 74/325 |
| 2009/0139355 A1 | 6/2009 | Cho | |

FOREIGN PATENT DOCUMENTS

| | | |
|---|---|---|
| EP | 0748966 A1 | 12/1996 |
| GB | 2103317 A | 2/1983 |

OTHER PUBLICATIONS

International Preliminary Report on Patentability for corresponding International Application PCT/EP2010/02853.

* cited by examiner

Fig. 1a

| | 1 | 2 | 3 | 4 |
|---|---|---|---|---|
| 121 | • | | • | |
| 122 | | • | | • |
| 140 | • | • | | |
| 150 | • | | | • |
| 160 | | | • | • |

| | R1 | R2 | 1 | 2 | 3 | 4 |
|---|---|---|---|---|---|---|
| 121 | • | | • | | • | |
| 122 | | • | | • | | • |
| 370 | • | • | | | | |
| 340 | | | • | • | | |
| 150 | • | | • | | | • |
| 160 | | | | | • | • |

INTERLOCKING DEVICE IN A VEHICLE TRANSMISSION

BACKGROUND AND SUMMARY

The present invention relates to vehicle transmissions, especially with automatic gear shifting, and more particularly to a device for preventing the engagement of combinations of tooth clutches that would block the shafts of the transmission.

The conventional stepped transmission for rear-wheel drive vehicles can be regarded as a robust, compact and cost-effective product. A typical example of such a lay-out is shown in FIG. 2 in DE10242823A1. An input shaft is coaxial with a main (output) shaft and parallel with a countershaft. A gearwheel that is rotationally fixed on the input shaft meshes with a gearwheel that is rotationally fixed on the countershaft. Several pairs of meshing gearwheels are then located side by side. In each of these pairs, one gearwheel is coaxial with the countershaft; the other is coaxial with the main shaft. One of these gearwheels is rotationally fixed on its coaxial shaft. The other gearwheel; the loose gearwheel, is free to rotate relative to its coaxial shaft, but can be rotationally locked to the shaft by a mechanical tooth clutch. This construction is used for manually shifted transmissions as well as for automated mechanically engaged transmissions, AMT: s. Because of the mechanical tooth clutches, there will during the shift be an interruption of the power transfer between the engine and the driven wheels of the vehicle. Thus, this type of transmission is not power-shifting.

If the loose gearwheels in two gearwheel pairs at the same time would be locked rotationally to their shafts, the transmission would be blocked and the shafts therein could not rotate. This could lead to damage, e.g., broken gear or clutch teeth, and must be prevented. In manual transmissions, the dominant "H-type" shift pattern enables straightforward design of the shift control system to prevent blocked shafts. In AMT: s, blocked shafts can be prevented by proper software, at least under normal conditions. However, in case of faults, e.g., on sensors and/or valves, blocking of shafts could possibly occur. In some designs, this is prevented by designing the automatic shift actuation system similar to a manual one, with one actuator corresponding to longitudinal motion of the shift lever and one actuator corresponding to sideways motion. Such a design might in addition reduce the number of components, but is, in general, not able to allow as quick shifts as a system with one actuator for each tooth clutch. In order to prevent blocked shafts, those latter systems often have an interlocking pin between grooves in the shift actuation parts of two tooth clutches. The length of this pin is adapted to allow one tooth clutch, but not both, engaged. This is a simple, robust and cost-effective design.

Dual clutch transmissions are an interesting crossbreed between power-shifting planetary transmissions and conventional stepped transmissions with power interruption at gear shifts. In principle, a dual clutch transmission has two input shafts, each connectable with a friction clutch to the output shaft of the engine. Functionally, this is equivalent to having two conventional transmissions in parallel and using one at a time for power transfer. The parallel transmission that is not used, idling, for the time being, can have a gear engaged and prepared for a subsequent shift. This shift is carried out by simultaneously disengaging the friction clutch of the previously used parallel transmission and engaging the friction clutch of the previously idling parallel transmission.

When properly designed, dual clutch transmissions have a potential of providing power-shifts at a reasonable production cost and low power losses. This is due to the fact that the rotating parts, i.e., gearwheels, shafts and tooth clutches, are similar to those in conventional stepped transmissions. This, furthermore, enables the use of the same production equipment. So, it makes sense to produce dual clutch transmissions in the same facilities as used for conventional stepped transmissions.

Dual clutch transmissions for rear wheel drive vehicles often have two separate countershafts, one connected to each input shaft. One example is found in U.S. Pat. No. 5,150,628. These countershafts make the transmission considerably wider than a conventional stepped transmission. That may lead to difficulties in installing the transmission into the vehicle. However, in some dual clutch transmission designs there is only one countershaft, e.g., as in DE923402, DE3131156A1 and DE102005044068A1. On such a countershaft there are loose gearwheels arranged that can be rotationally connected to each other and to the countershaft by means of mechanical tooth clutches. In a way, this can be regarded as if the second countershaft is arranged coaxial to the first one. The result will be a power-shiftable dual clutch transmission that is not wider than a corresponding conventional stepped transmission. However, the tooth clutches on the countershaft make it more difficult to prevent blocking of shafts. Often, some combinations of the states of three or four tooth clutches may give blocked shafts, whereas other combinations are used for ordinary power transfer. Similar conditions can be found also for dual clutch transmissions that have two separate countershafts. An effective way to prevent blocked shafts in such complex transmissions is to use shift barrels for controlling the tooth clutches, e.g., as in U.S. Pat. No. 5,966,989. Unfortunately, shift barrels normally only allow sequential shifting, i.e., from one gear to the adjacent higher or lower. Multi-step shifts are not possible, in general. Another alternative is to use an active shift blocking system, e.g., as in U.S. RE39598E. That would, however, increase the complexity and cost significantly.

US2009139355 discloses a dual clutch transmission with means for blocking gear changes. The transmission may include: a control bar including a hole; a first shift rail and a second shift rail that are respectively disposed along the control bar; first springs biasing the first rail and the second rail respectively; a first stop and a second stop that are mounted in respective inner grooves of the first rail and the second rail; second springs that elastically support the stops and insert the stops into the hole according to the movement of the rail's. Spring loaded stops will engage with one of the shift forks in a predetermined fork position in order to prevent an undesired gear shift. However, these means only prevent undesirable states of two tooth clutches that would give blocking of shafts.

It is desirable to further develop an interlocking device for preventing engagement of forbidden combinations of tooth clutches in a vehicle transmission.

It is desirable to solve the above problem and to provide an alternative system for preventing engagement of forbidden combinations of tooth clutches in a vehicle transmission.

According to a first aspect of the invention, there is provided an interlocking device arranged to prevent at least one forbidden combination of engaged/disengaged positions of three tooth clutch groups in a vehicle transmission, where each tooth clutch group when in engaged position is arranged to rotationally lock a first shaft to a gearwheel or to a second shaft and when in a disengaged position to rotationally unlock said first shaft from said gearwheel or said second shaft, and where for each tooth clutch group a shift rod is arranged to push a tooth clutch in a tooth clutch group between an engaged and disengaged position. The device is characterized in that said interlocking device comprising:—movable elements where each movable element is directed towards one of said shift rods in order to lock one of said tooth clutch groups in said disengaged position;—an interlocking element arranged in the middle of said movable elements; and where a diameter of said interlocking element and lengths of said movable elements are adapted to allow only two of the tooth clutch groups to be engaged simultaneously.

With the invention a more simple, reliable and cost-effective mechanical system to prevent shafts from being blocked by combinations of at least three tooth clutches is achieved for complex stepped non-planetary transmissions.

According to one embodiment of the invention said movable elements are pins movable radially towards said shift rods.

According to one further embodiment of the invention a groove is arranged on each of said shift rods and where each of said grooves is centred with one of said pins when the tooth clutches are in said disengaged position.

According to one embodiment of the invention said movable elements are protruding bars where each of said protruding bar is fixedly arranged on said shift rod.

According to another embodiment of the invention a groove is arranged on each of said protruding bars.

According to one embodiment of the invention said groove comprises at least one ramp that mate with corresponding chamfers arranged on interlocking element.

According to a further embodiment of the invention at least one of said protruding bars comprises a twin arrangement where each of two protruding bars is fixedly arranged on corresponding said shift rod.

According to another embodiment of the invention some of said movable elements are pins and some are protruding bars.

According to one embodiment of the invention each of said tooth clutch groups comprising only one tooth clutch.

According to another embodiment of the invention two tooth clutch groups comprise only one tooth clutch and one tooth clutch group comprises two tooth clutches, and where another interlocking element is arranged to interact with said interlocking element via one of said pins.

According to a further embodiment of the invention said interlocking element is puck-shaped. According to a further embodiment of the invention said interlocking element is instead ball-shaped.

BRIEF DESCRIPTION OF THE DRAWINGS

The present invention will be described in greater detail below with reference to the accompanying drawings which, for the purpose of exemplification, shows further preferred embodiments of the invention and also the technical background, and in which.

DETAILED DESCRIPTION

Figure 1A:
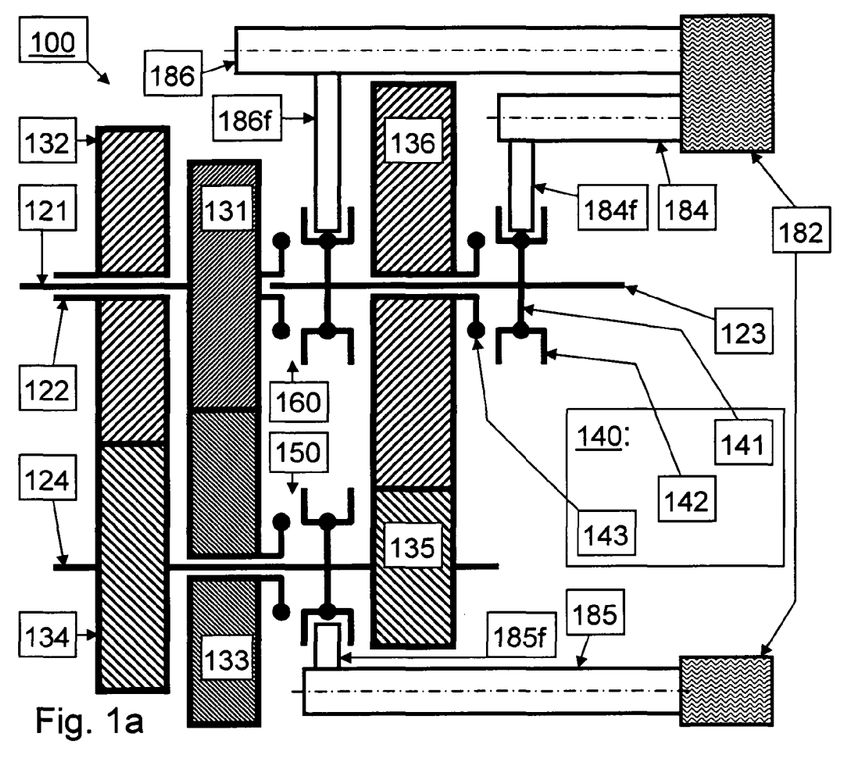
FIGS. 1a, 2a, 3a, 4a and 4b diagrammatically show different configurations of transmissions.

FIG. 1a shows schematically a dual clutch main transmission 100. There is a first input shaft 121 and a coaxial second input shaft 122. Each input shaft can be drivably connected to a prime mover by a dual frictional clutch unit (not shown). A main and output shaft 123 is arranged coaxial to input shafts 121 and 122. A countershaft 124 is arranged parallel thereto.

A first input shaft gearwheel 131 is integral or rotationally fixed with the first input shaft 121. Similarly, a second input shaft gearwheel 132 is integral or rotationally fixed with the second input shaft 122. The first input shaft gearwheel 131 is in mesh with a primary countershaft loose gearwheel 133 that is arranged on the countershaft 124. A second countershaft primary gearwheel 134 is integral or rotationally fixed with the countershaft 124 and in mesh with the second input shaft gearwheel 132. A countershaft secondary gearwheel 135 is integral or rotationally fixed with the countershaft 124 and meshes with a secondary loose gearwheel 136 rotatably arranged on the main and output shaft 123.

The secondary loose gearwheel 136 can selectably be rotationally locked by a first tooth clutch 140 to the main and output shaft 123. The first tooth clutch 140 comprises schematically a hub 141 that is integral or rotationally fixed with the main and output shaft 123, an engaging sleeve 142 that is rotationally locked but axially moveable relative the main and output shaft 123, and a set of clutch teeth 143 on the secondary loose gearwheel 136. Similarly, a countershaft tooth clutch 150 can selectably rotationally lock the primary countershaft loose gearwheel 133 to the countershaft 124. Finally, the first input shaft 121 can selectably be rotationally locked to the main and output shaft 123 by a direct tooth clutch 160.

The tooth clutches 140, 150 and 160 are controlled by an actuator unit, schematically referred to as 182, via shift rods 184, 185 and 186 and shift forks 184f, 185f and 186f, respectively.

Figure 1B:
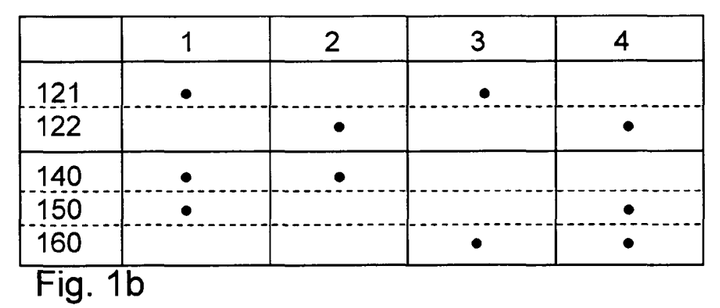
FIGS. 1b, 2b and 3b disclose tables over how different possible gears can be engaged.

FIG. 1b shows how different gears 1-4 are achieved in the transmission 100; a dot indicates active input shaft and engaged tooth clutch. When any of gears 2 and 3 is active, the adjacent higher or lower gear may be preselected in the idling, inactive sub-transmission. In FIG. 1a it can be seen that the shafts would be blocked by a simultaneous engagement of all three tooth clutches 140, 150 and 160. That would connect the first input shaft 121 to the main and output shaft 123 in two ways; directly with the direct tooth clutch 160 and indirectly via the first input shaft gearwheel 131, primary countershaft loose gearwheel 133, countershaft tooth clutch 150, countershaft 124, countershaft secondary gearwheel 135, secondary loose gearwheel 136 and first tooth clutch 140. This corresponds to the following logical expression that should be prevented: (140 engaged) AND (150 engaged) AND (160 engaged)

Figure 2A:
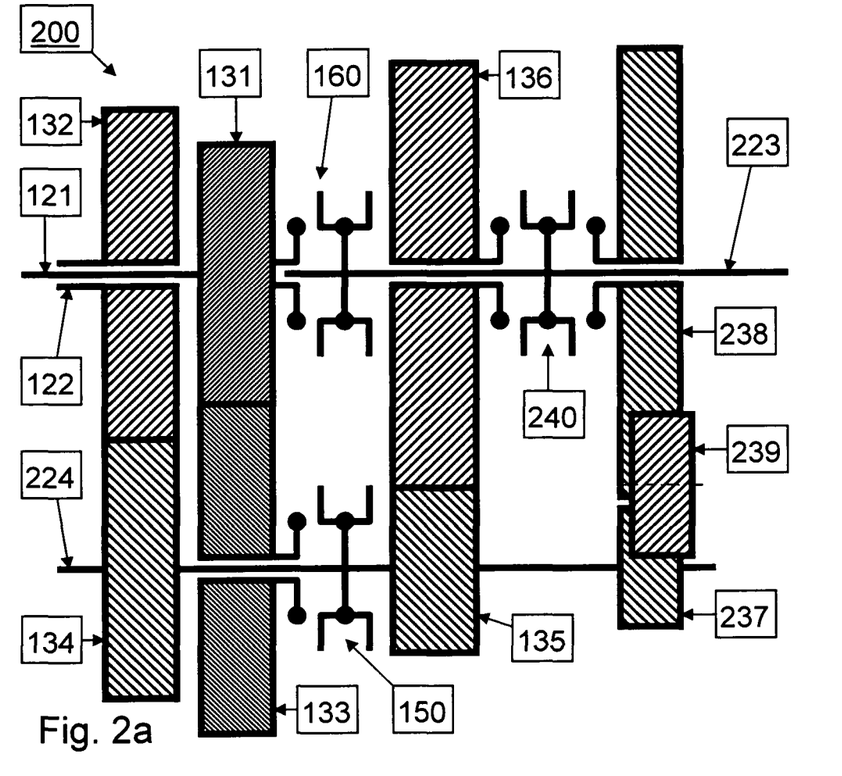

FIG. 2a shows schematically a dual clutch transmission 200 that, basically, is a variant of the transmission 100 with a reversing gear stage with gear wheels 237-239-238 added. Parts that are, or could be, identical are referred by the same numbers. Corresponding, but not identical parts have the same number except for the first digit.

Figure 2B:
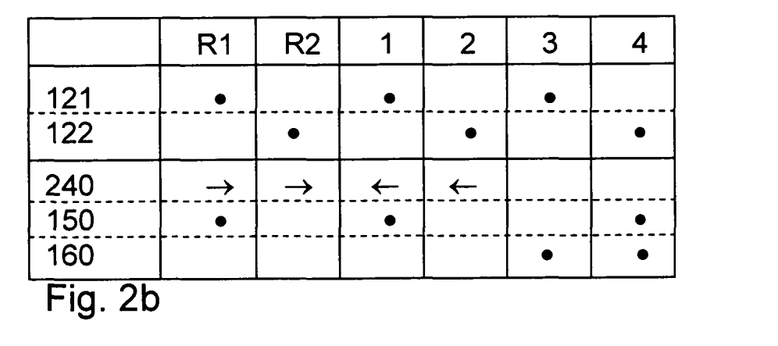

A countershaft reverse gearwheel 237 is integral or fixed with a modified countershaft 224. A reverse loose gearwheel 238 is arranged on a modified main and output shaft 223. A reverse idler gearwheel 239 meshes with the countershaft reverse gearwheel 237 and reverse loose gearwheel 238. A first/reverse tooth clutch 240 can selectively rotationally lock either the secondary loose gearwheel 136 or the reverse loose gearwheel 238 to the main and output shaft 223. The first/reverse tooth clutch 240 can be referred to as a double-acting tooth clutch. The states of the tooth clutches 240, 150 and 160 for achieving the different gears are shown in FIG. 2b. It can be noted that the first/reverse tooth clutch 240 has three possible states; neutral, left (engaging the secondary loose gearwheel 136) and right (engaging the reverse loose gearwheel 238). When the reverse loose gearwheel 238 is engaged this is denoted by an arrow pointing to the right in FIG. 2b. When the secondary loose gearwheel 136 is engaged this is denoted by an arrow pointing to the left in FIG. 2b. The shafts in the transmission 200 would be blocked if all three tooth clutches are engaged at the same time, corresponding to the following logical expression:

(240 engaged) AND (150 engaged) AND (160 engaged)

This can be expressed in more detail:

[(240 engaged left) OR (240 engaged right)] AND (150 engaged) AND (160 engaged)

Figure 3A:
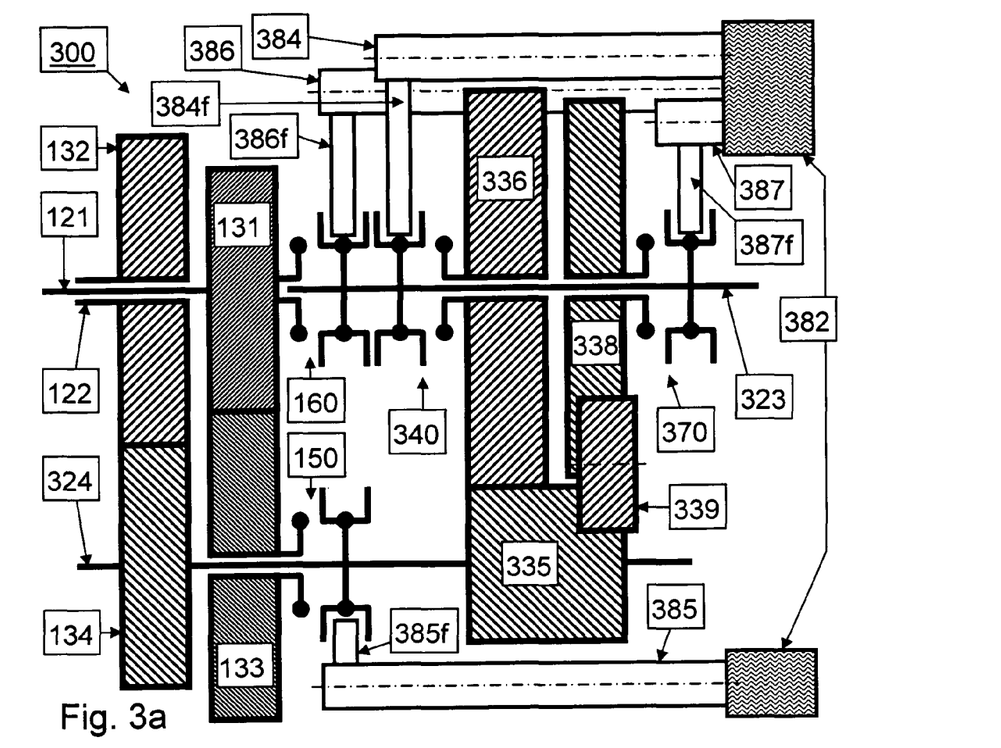

A modified dual clutch transmission 300 is shown in FIG. 3a. This can also be seen as a variant of the transmission 100. Parts that are, or could be, identical with the transmission 100 are referred by the same numbers. Corresponding, but not identical parts have the same number except for the first digit. In FIG. 3a, a widened countershaft secondary gearwheel 335 is integral or fixed with a modified countershaft 324. Furthermore, this countershaft secondary gearwheel 335 meshes with a modified secondary loose gearwheel 336 and a modified reverse idler gearwheel 339 that, in turn, is in mesh with a modified reverse loose gearwheel 338. A modified first tooth clutch 340 can selectively rotationally lock the secondary loose gearwheel 336 to a modified main and output shaft 323. Similarly, the reverse loose gearwheel 338 can selectively be rotationally locked to the main and output shaft 323 by a reverse tooth clutch 370. The tooth clutches are controlled by a modified actuator unit 382 via shift rods 384, 385, 386 and 387, and shift forks 384f, 385f, 386f and 387f.

Figure 3B:
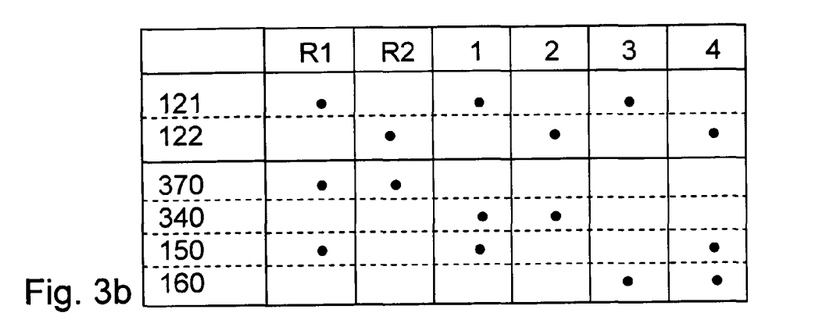

FIG. 3b shows the states of the tooth clutches for achieving the different gears. The logical expression that corresponds to blocked shafts is:

[(340 engaged) OR (370 engaged)] AND (150 engaged) AND (160 engaged)

As a variant of FIGS. 3a and 3b, the first tooth clutch 340 and reverse tooth clutch 370 could have their corresponding shift rods 384 and 387 connected for axial motion, i.e., driven by a common actuator, or the shift forks 384f and 387f could even be mounted on a common shift rod. This would be readily recognized by a person skilled in the art. It can be regarded as a combined double-acting tooth clutch that is composed of two single-acting tooth clutches.

Figure 4A:
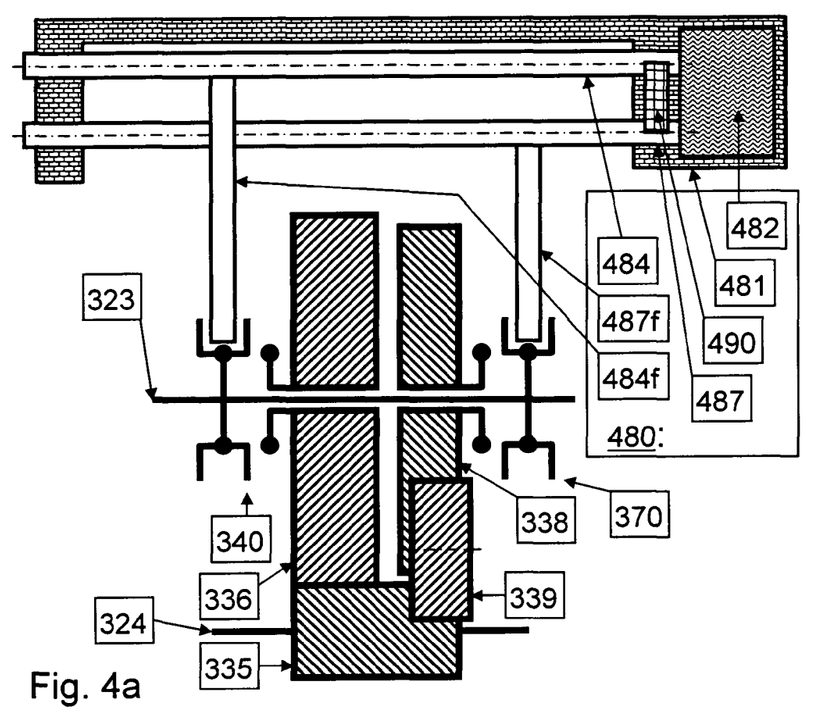

FIG. 4a shows a close-up between the first tooth clutch 340 and reverse tooth clutch 370 of a variant of the transmission 300. A shift control unit 480 comprises a housing 481, an actuator unit 482, shift rod 484 and shift fork 484f for controlling the first tooth clutch 340, shift rod 487 and shift fork 487f for reverse tooth clutch 370, and an interlocking device 490.

Figure 4B:
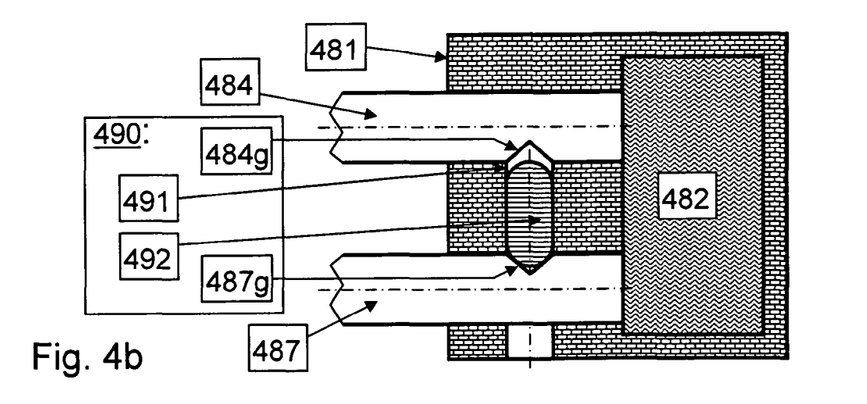

In FIG. 4b, the interlocking device 490 is shown in more detail. In the housing 481, there is a hole 491 that is coplanar with, but perpendicular to, the shift rods 484 and 487. Therein, an interlocking pin 492 is arranged. The shift rods 484 and 487 have grooves 484g and 487g that are centred with the hole 491 when the tooth clutches 340 and 370 are in neutral position. The length of the interlocking pin 492 is adapted to allow one of the shift rods 484 or 487 to be displaced, i.e., to engage its tooth clutch, so that its groove 484g or 487g is offset compared to said hole 491. Then, the interlocking pin 492 would be pushed into the groove of the other shift rod. Then, this shift rod cannot be displaced and is therefore locked. This is a widely-used way to prevent shafts from being blocked by simultaneous engagement of two tooth clutches. A corresponding logical expression for that is as follows:

(340 engaged) AND (370 engaged)

Figures 5A, 5B:
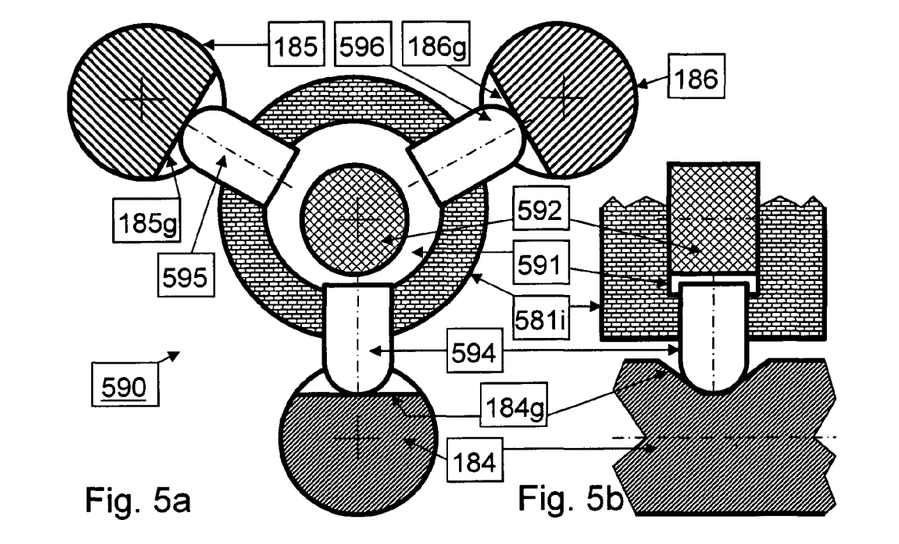
FIGS. 5 to 10 diagrammatically disclose different embodiments of the invention.

FIG. 5a shows a cross section of an interlocking device 590 according to the invention for the transmission 100 of FIG. 1a. The shift rods 184, 185 and 186 are arranged in positions relative each other that forms a triangular form. In the middle thereof, a portion 581i of a shift control housing is arranged. The shift control housing portion 581i comprises a hollow 591. Therein, a puck-shaped interlocking element 592 is arranged. Pins 594, 595 and 596 are slidably arranged in portion 581i and directed radially towards the shift rods 184, 185 and 186, respectively. The shift rods 184, 185 and 186 have grooves 184g, 185g and 186g that are centred with the pins 594, 595 and 596 when the tooth clutches 140, 150 and 160 are in neutral position. FIG. 5b shows a longitudinal section of lower parts of what is shown in FIG. 5a and through the shift rod 184 and the pin 594. The corresponding as in FIG. 5b would be seen if a longitudinal section were disclosed through the shift rod 185 and the pin 596 or the shift rod 185 and the pin 596 respectively.

Figures 6A, 6B:
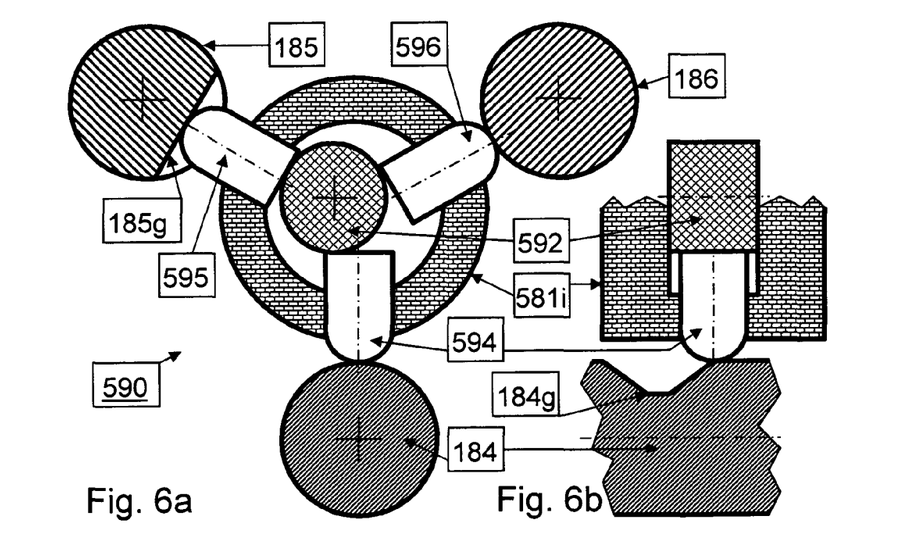

The diameter of the interlocking element 592 and the lengths of the pins 594, 595 and 596 are adapted to allow two of the tooth clutches 140, 150 and 160 to be engaged simultaneously. The grooves of the corresponding shift rods are then offset, which will push the pin of the third shift rod into its groove.—Thereby, this shift rod is prevented from displacing, and the corresponding tooth clutch will remain in neutral position. This is shown in FIGS. 6a and 6b, where the shift rods 184 and 186 are displaced from the neutral positions of FIGS. 5a and 5b. Thus, the shift rod 185 is prevented from displacing, and the tooth clutch 150 cannot be engaged. The engagement of a forbidden combination of tooth clutches is prevented.

A corresponding interlocking device as said 590 can be applied also on the transmission 200 in FIG. 2a since the groove 184g has two ramps, one on each side of the pin 594 in FIG. 5a. This conclusion can be generalized; for a tooth clutch with two engaged positions and an intermediate neutral position, e.g., as the first/reverse tooth clutch 240, two ramps will give proper function. For tooth clutches with only one engaged position, one ramp is sufficient.

Figures 7A, 7B:
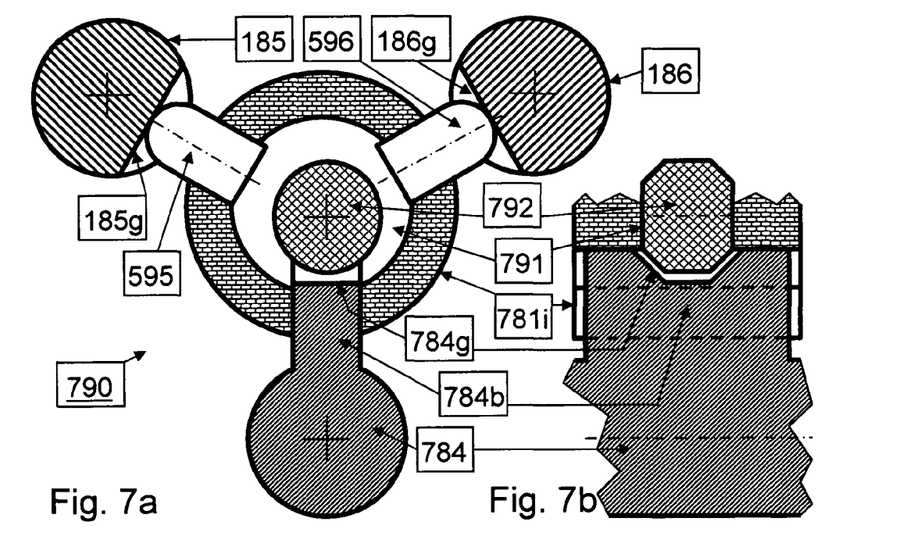

FIGS. 7a and 7b show an alternative embodiment according to the invention, a modified interlocking device 790. A protruding bar 784b is fixed to or integral with a modified shift rod 784. The protruding bar 784b is slidably arranged in a modified shift control housing portion 781i, and has a groove 784g whose ramps mate with chamfers on a modified interlocking element 792. For the rest, the interlocking device 790 is equivalent to interlocking device 590. Said modified interlocking device 790 can be applied in said transmissions 100 and 200. In a further embodiment not disclosed said arrangement with a protruding bar 784b can be implemented for locking one or two of said shift rods 185 and/or 186 as well instead of said pins 595 and/or 596.

Figures 8, 9:
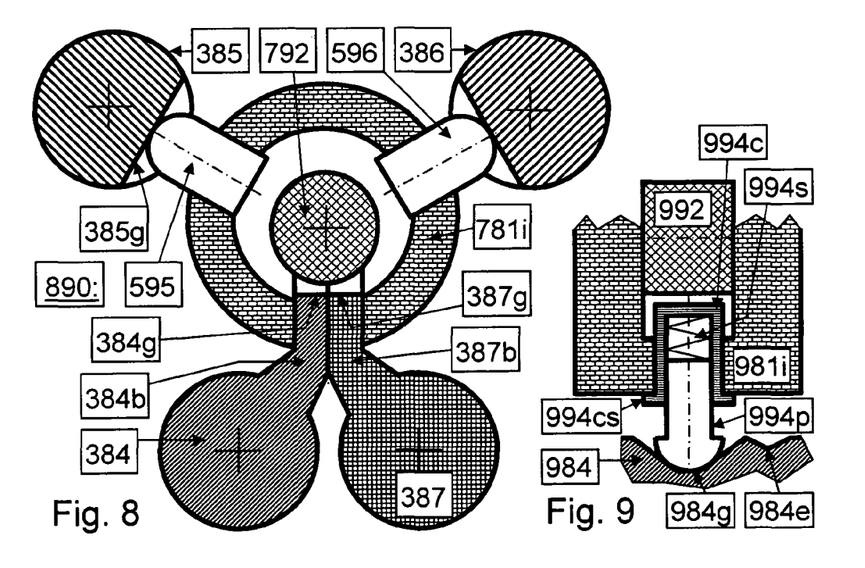

FIG. 8 shows a cross section of an interlocking device 890 according to the invention for the transmission 300 of FIG. 3a. There, the OR function in the corresponding logical expression is embodied by a side-by-side arrangement of the protruding bars 384b and 387b on the shift rods 384 and 387. Hence, if any of these shift rods would be displaced from neutral position, the corresponding groove 384g or 387g would push the interlocking element 792 upwards. A simultaneous engagement of any of the tooth clutches corresponding to shift rods 385 and 386 would then lock the remaining shift rod in neutral position, cf. FIG. 6a.

The design in FIG. 8 can be generalized. Any of the shift rods 385 and 386 could be replaced by a twin arrangement like the disclosed shift rods 384 and 387. Furthermore, more than two shift rods could be arranged side-by-side and, when displaced from neutral position, push interlocking element 792 in one direction.

Thereby, more complex logical expressions for preventing combinations of engaged tooth clutches can be embodied.

US2006/0230861A1 has a similar way to embody an OR function. Moreover, the peripheral side-by-side arrangement of the protruding bars 384b and 387b could be replaced by a longitudinal arrangement. There, the protruding bars would have different positions in axial direction close to the interlocking element 792. This would be well suited to cases where the two tooth clutches involved only have one engaged position each and, hence, only one ramp is needed in each groove. Another arrangement would be to have one protruding bar in the middle and the other one on both sides thereof. That would be well-suited for a coaxial arrangement of the rods 384 and 387.

FIG. 9 shows an advantageous embodiment of the invention. There, a detent function has been included that tends to retain the shift rod and tooth clutch in neutral or engaged position. The pins 594, etc., have been replaced by a detent cup 994c, a detent pin 994p and a detent spring 994s. The detent cup 994c is slidably arranged in the shift control housing portion 981i. The detent pin 994p is slidably arranged in a hollow centre of the detent cup 994c. The detent spring 994s pushes the detent pin 994p towards the shift rod 984. In neutral position, the detent pin 994p will be pushed towards the bottom of the groove 984g. Similarly, in engaged position, the detent pin 994p will be pushed towards the bottom of an engaged detent groove 984e. In both cases, the force from the detent spring 994s will tend to retain the shift rod 984 in the present position. In order to secure a minimum spring force, the motion of the detent cup 994c is limited by a shoulder 994cs. FIG. 9 shows a non interlocking state. If the other shift rods (corresponding to 185, 186, etc.) would be engaged, the interlocking element 992 would push down the detent cup 994c and thereby making it impossible for the detent pin 994p to move upwards in the figure. Hence, a displacement of the shift rod 984 would be prevented. On the other hand, if the shift rod 984 would be engaged, the detent pin 994p would be pushed upwards to a resting position in the engaged detent groove 984e. A downwards motion of the detent cup 994c and interlocking element 992 would be prevented.

The invention can be generalized to embody four AND functions by using a three-dimensional interlocking device. The corresponding parts to the shift control housing portions 581i,781i and interlocking elements 592,792 could be substantially spherical. Four pins, corresponding to 594, etc., could be oriented with equal angles in space in-between, as the corners of a regular tetrahedron or the hydrogen atoms in a methane molecule.

Figure 10:
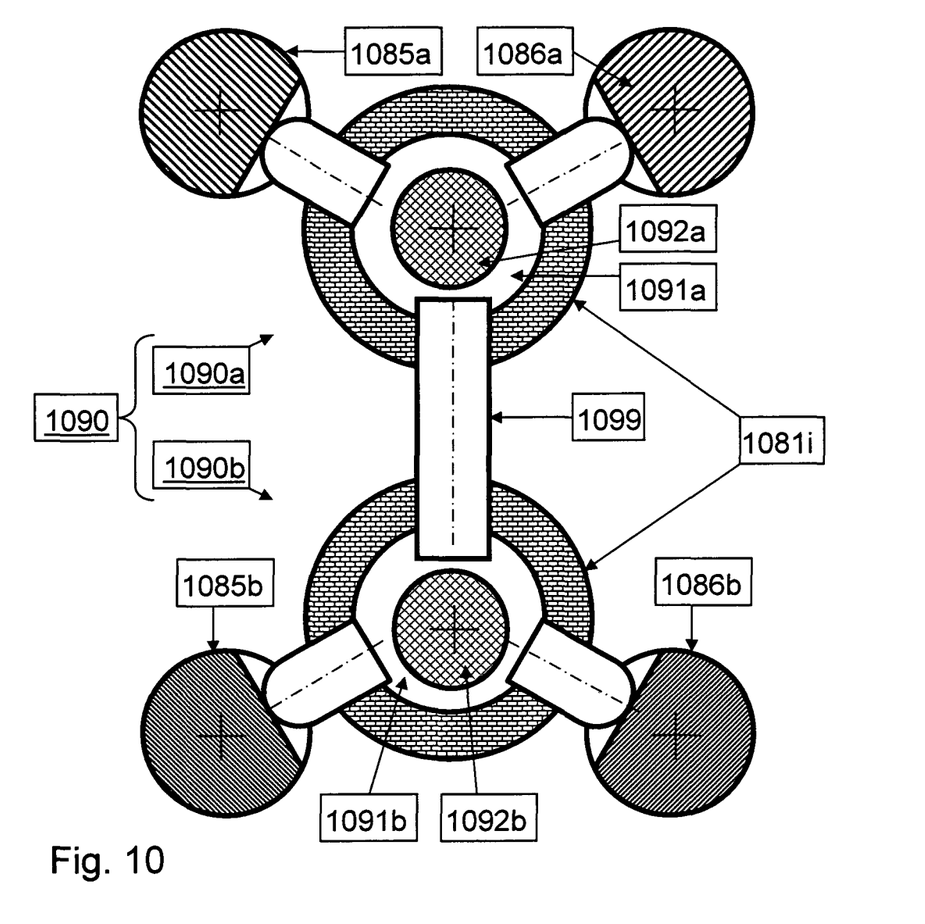

Another way to embody four AND functions is shown in FIG. 10. There, two interlocking devices 1090a and 1090b are arranged, each with two shift rods 1085a-1086a and 1085b-1086b, respectively. The interlocking sub-devices 1090a and 1090b are mated with a common intermediate pin 1099. Thereby, the interlocking sub-devices can be regarded as replacing the third shift rod for the each other. If both shift rods of an interlocking sub-device are engaged, the intermediate pin 1099 is pushed towards the other interlocking sub-device. There, it will interact with the shift rods in the same way as shown in FIGS. 5a, 5b, 6a and 6b. This can be generalized; any of the shift rods 1085a, 1086a, 1085b and 1086b can be substituted by an intermediate pin and interlocking sub-device that handles two shift rods. In further embodiments said embodiments as disclosed in FIGS. 7 and 8 can be used at least partly in order to create further variants of the embodiment in FIG. 10. For example said twin-arrangement and/or said arrangement with a protruding bar can be implemented instead of one or several of said shift rods/pin arrangements as disclosed in FIG. 10.

The invention has been described with a certain degree of particularity. However, several variations are possible within the scope of the invention, as is obvious to a person skilled in the art. For instance, the portions 581i, etc., may or may not be a part of the shift control housing. The protruding bars 384b, etc., may or may not be integrated with the shift rods or shift forks. The protruding bars can be embodied in several ways, e.g., as a separate rod or pin that is fixed directly or indirectly to the shift rod. The interlocking elements 192, etc., may or may not have a circular cross-section.

It shall be noted that the tooth clutches 140, etc., may or may not have synchronizing parts in order to facilitate engagement, as is readily known by a person skilled in the art.

The invention would be equally applicable on transmission designs with hinged, so-called rocking shift forks that are not firmly fixed to shift rods. Moreover, the parts with a groove (184g, etc.), do not have to move linearly. A rotating motion, or a combination of linear and rotating motion, would be possible, as recognized by a person skilled in the art.

In a further embodiment of said above described embodiments said interlocking element is ball-shaped.

The invention should not be deemed to be limited to the embodiments described above, but rather a number of further variants and modifications are conceivable within the scope of the following patent claims.

The invention claimed is:

1. An interlocking device arranged to prevent at least one forbidden combination of engage/disengaged positions of three tooth clutch groups in a vehicle transmission, where each tooth clutch group when in engaged position is arranged to rotationally lock a first shaft to a gearwheel or to a second shaft and when in a disengaged position to rotationally unlock the first shaft from the gearwheel or the second shaft, and where for each tooth clutch group a shift rod is arranged to push a tooth clutch in a tooth clutch group between an engaged and disengaged position, the interlocking device comprising:
    movable elements where each movable element is directed towards one of the shift rods in order to lock one of the tooth clutch groups in the disengaged position; and
    an interlocking element arranged in the middle of the movable elements and having puck-shape or a ball-shape;
    wherein a diameter of the interlocking element and lengths of the movable elements are adapted to allow only two of the tooth clutch groups to be engaged simultaneously, and at least one of the movable elements is a protruding bar where each of the protruding bar is fixedly arranged on a corresponding shift rod, and where the protruding bar is slidably arranged together with the corresponding shift rod.

2. An interlocking device as in claim 1, wherein a groove is arranged on the protruding bar.

3. An interlocking device as in claim 2, wherein the groove comprises at least one ramp that mates with corresponding chamfers arranged on interlocking element.

4. An interlocking device as in claim 1, wherein the protruding bar comprises a twin arrangement comprising a first and a second protruding bar, where each of first and second protruding bars is fixedly arranged on a corresponding first and second shift rod, respectively.

5. An interlocking device as in claim 2, wherein at least one of the movable elements is a pin.

6. An interlocking device as in claim 1, wherein each of the tooth clutch groups comprising only one tooth clutch.

7. An interlocking device as in claim 2, wherein two tooth clutch groups comprise only one tooth clutch and one tooth clutch group comprises two tooth clutches, and where another interlocking element is arranged to interact with the interlocking element via a pin.

* * * * *